US006533343B2

United States Patent
Bohm et al.

(10) Patent No.: US 6,533,343 B2
(45) Date of Patent: Mar. 18, 2003

(54) SUBASSEMBLY ELEMENT AS INTERMEDIATE PRODUCT FOR A CLOSURE ELEMENT FOR VEHICLES CONSISTING OF SEVERAL SUBASSEMBLY PARTS, MANUFACTURING METHOD THEREFOR, MULTIPART CLOSURE ELEMENT FOR VEHICLES CONSTRUCTED FROM THE INTERMEDIATE PRODUCT

(75) Inventors: Horst Bohm, Frankfurt (DE); Rainer Grimm, Frankfurt (DE)

(73) Assignee: Arvin Meritor GmbH, Dietzenbach (DE)

( * ) Notice: Subject to any disclaimer, the term of this patent is extended or adjusted under 35 U.S.C. 154(b) by 0 days.

(21) Appl. No.: 09/931,442

(22) Filed: Aug. 16, 2001

(65) Prior Publication Data

US 2002/0021019 A1 Feb. 21, 2002

(30) Foreign Application Priority Data

Aug. 17, 2000 (DE) ..................... 100 40 701.3

(51) Int. Cl.$^7$ ................ B60P 7/02; B60J 7/04
(52) U.S. Cl. ............ 296/100.02; 296/100.03; 296/100.06; 296/216.01; 296/216.02; 296/216.04; 296/216.06
(58) Field of Search .............. 296/100.02, 100.03, 296/100.06, 100.09, 220.01, 216.01, 216.02, 216.09, 219, 222, 213, 214, 216.04, 216.06

(56) References Cited

U.S. PATENT DOCUMENTS

| | | | | |
|---|---|---|---|---|
| 4,474,405 A | * | 10/1984 | Kloppe et al. ............... 296/220 |
| 5,087,093 A | * | 2/1992 | Repetti .................... 296/100.09 |
| 5,306,069 A | * | 4/1994 | Becker et al. ............... 296/217 |
| 5,350,213 A | * | 9/1994 | Bernardo ...................... 296/98 |
| 5,836,642 A | * | 11/1998 | Salz ........................ 296/216.02 |
| 5,961,173 A | * | 10/1999 | Repetti ..................... 296/37.6 |
| 6,053,568 A | * | 4/2000 | Jambor ......................... 296/213 |
| 6,106,050 A | * | 8/2000 | McLeod ................. 296/100.06 |
| 6,176,541 B1 | * | 1/2001 | Hoff ....................... 296/100.09 |
| 6,224,138 B1 | * | 5/2001 | Adsit et al. ............ 296/100.05 |
| 6,270,154 B1 | * | 8/2001 | Farber ......................... 296/213 |
| 6,296,302 B1 | * | 10/2001 | Martinus Lenkens .. 296/220.01 |
| 6,321,819 B1 | * | 11/2001 | Copp et al. .................... 160/35 |
| 6,364,407 B1 | * | 4/2002 | Raisch et al. .......... 296/216.06 |
| 6,409,260 B1 | * | 6/2002 | Bohm et al. ........... 296/220.01 |
| 6,435,594 B1 | * | 8/2002 | Ekonen et al. ......... 296/100.09 |

FOREIGN PATENT DOCUMENTS

| | | |
|---|---|---|
| DE | 34 29 092 A1 | 8/1984 |
| DE | 44 45 943 C1 | 12/1994 |

\* cited by examiner

*Primary Examiner*—Dennis H. Pedder
*Assistant Examiner*—Greg Blankenship
(74) *Attorney, Agent, or Firm*—Carlson, Gaskey & Olds

(57) ABSTRACT

A subassembly element in the form of an intermediate product for a multipart cover element for motor vehicles contains at least two subassembly parts, e.g., for a multipart sunroof or sliding roof cover or for a multipart loading zone or cargo space cover, containing edge regions on the adjacent edges of the subassembly parts which are correspondingly shaped such that they had least partially overlap in the closed position. All subassembly parts are present in the form of one connected-together part and are shaped in accordance with the predetermined contour of the cover element. A channel-shaped depression is arranged at least in the outer side of the subassembly element in the edge region in which two respective subassembly parts adjoin one another. The contour of the channel-shaped depression is comprised of the desired contours of the edge regions of adjacent subassembly parts of the respective cover element.

20 Claims, 4 Drawing Sheets

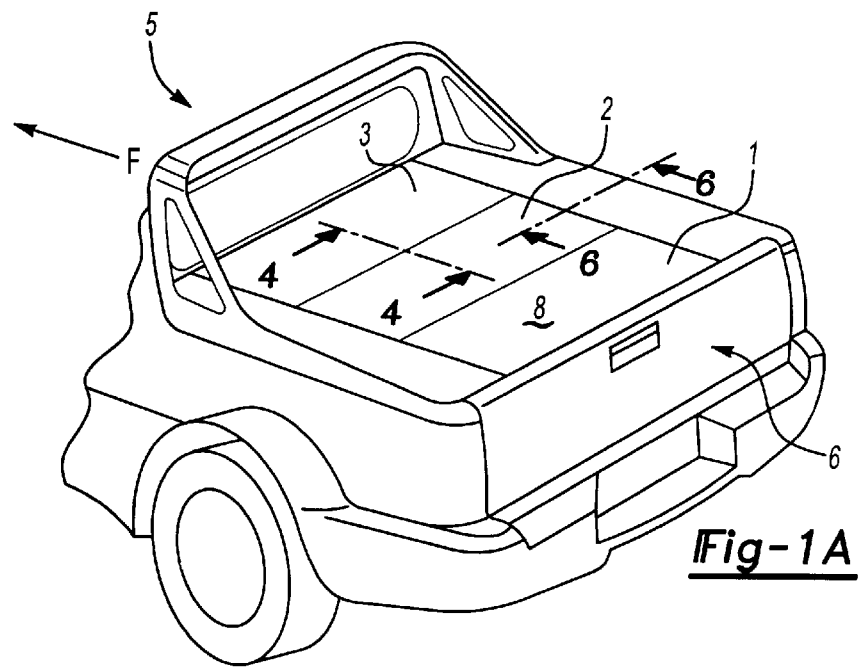
Fig-1A
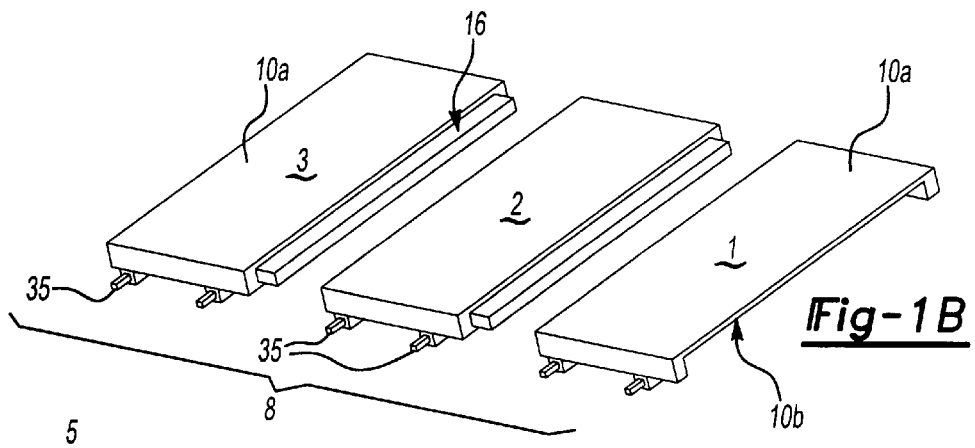
Fig-1B
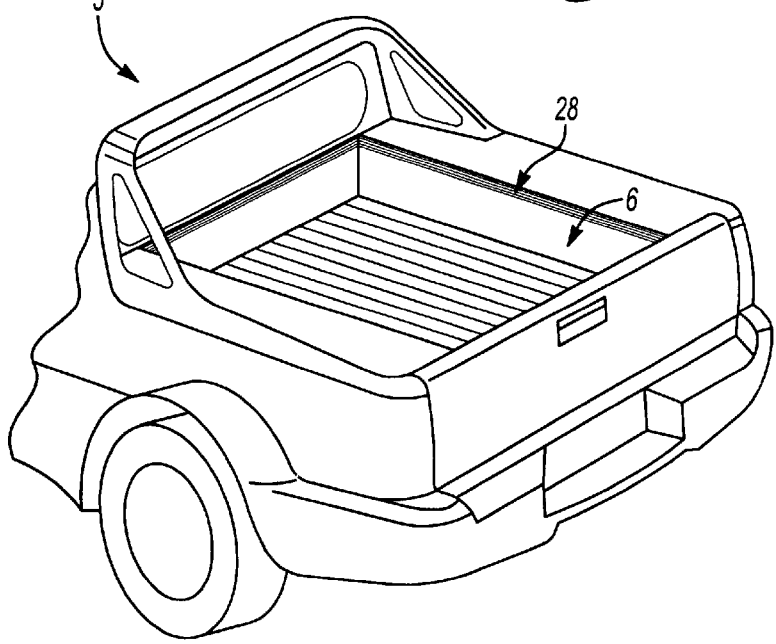

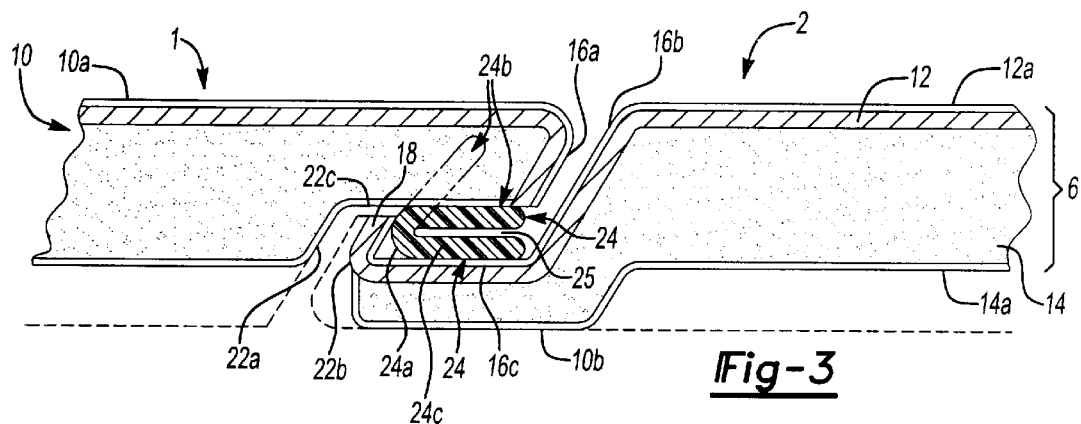
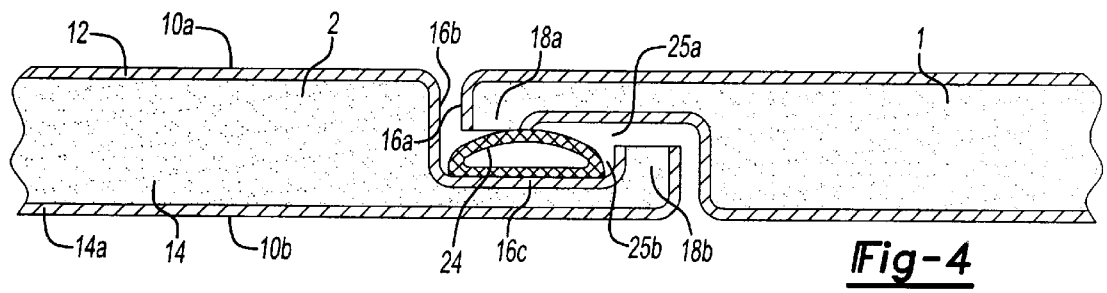
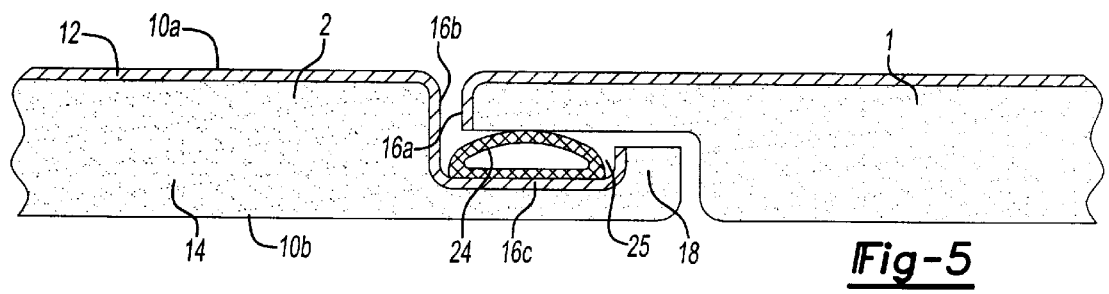
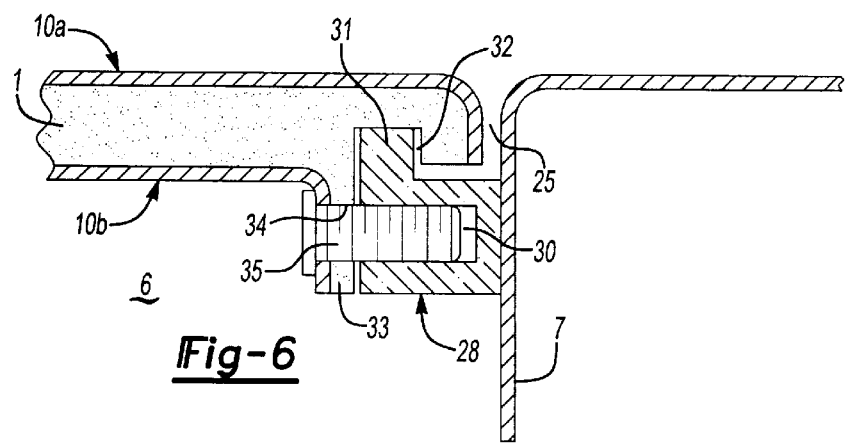

SUBASSEMBLY ELEMENT AS INTERMEDIATE PRODUCT FOR A CLOSURE ELEMENT FOR VEHICLES CONSISTING OF SEVERAL SUBASSEMBLY PARTS, MANUFACTURING METHOD THEREFOR, MULTIPART CLOSURE ELEMENT FOR VEHICLES CONSTRUCTED FROM THE INTERMEDIATE PRODUCT

BACKGROUND OF THE INVENTION

The invention pertains to a subassembly element as an intermediate product for a cover element for motor vehicles which contains at least two subassembly parts. The invention also pertains to a cover element for motor vehicles which is manufactured with the intermediate product, as well as a method for manufacturing the subassembly parts of a cover element.

Multipart cover elements for motor vehicles of this type are, among other things, used as sunroofs, e.g., multi-spoiler sliding roofs, or as cover elements for other openings of the motor vehicle, e.g., for covering the cargo space of a so-called pickup truck.

The two or more subassembly parts of a multi-spoiler sliding roof that are designed in the form of cover parts are arranged in the roof opening of the motor vehicle to be covered, in the closed position of the sliding roof, in such a way that the surfaces of the cover parts essentially lie flush with the surface of the motor vehicle roof, the outer roof skin. This is done for aerodynamic and aesthetic purposes. Consequently, the cover parts need to be adapted to the shape of the outer roof surface such that the outer roof surface contains no steps in the closed position of the multi-spoiler sliding roof. This is why the cover parts of a multi-spoiler sliding roof have a surface that is slightly arched or curved. Consequently, it is necessary to adapt the surface contour of the individual cover parts to one another during their manufacture. Due to the different shapes of the cover parts of a multi-spoiler sliding roof that is divided two or more times, it is impossible to use identical cover parts. Under certain circumstances, these requirements also apply to covers for other openings of the motor vehicle, e.g., cargo space openings.

SUMMARY OF THE INVENTION

Consequently, the invention is based on the technical objectives of disclosing a subassembly element for a cover element for motor vehicles that can be rationally manufactured, and a method for manufacturing said cover element, in which the shape of the surface of the individual cover parts is adapted to one another; and of developing a multipart cover element for motor vehicles that can be manufactured with said subassembly element in a particularly simple fashion. These objectives are attained with a one-part subassembly element according to the characteristics of claim 1, the manufacturing method according to the characteristics of claim 19, as well as the cover element according to the characteristics of claim 14.

According to the invention, it was determined that it is advantageous to initially manufacture the at least two subassembly parts of the subassembly element in the form of a coherent component that represents an intermediate product. Due to the one-piece design of the subassembly element, a mutual adaptation of the different surface shapes of the different subassembly parts can be easily and reliably realized. Once the different subassembly parts are separated from one another after the previously described subassembly element is manufactured, it is possible to assemble a cover element in which the individual subassembly parts are adapted to one another with respect to their surface shape and/or the shape of their adjoining edges. Among other things, this makes it possible to realize a uniform curvature of the entire cover element such that, for example, the aerodynamics of the motor vehicle become, if at all, only insignificantly inferior in comparison to a motor vehicle with a one-part cover element.

The subassembly element that serves as an intermediate product contains a first channel-shaped depression in the transition regions between the subassembly parts to be subsequently formed thereof, and consequently in the edge region of the adjacent subassembly parts to be subsequently separated. This first channel-shaped depression is preferably followed directly by a second channel-shaped depression situated on the opposite side. However, both depressions are arranged in opposite sides of the subassembly element. If observed in a side view, a progression similar to a rectangular channel consequently results in the connecting region between the individual subassembly parts. The first depression is situated on the inner side of the subassembly element, with the second depression being correspondingly situated on the outer side of the adjacent subassembly element. Because the first recess and the second recess are situated very close to one another in the connecting region of the subassembly parts, only a web of the subassembly element remains between the depressions. This web forms a suitable location for subsequently separating the subassembly parts that are still connected to one another. This is the reason why the web is preferably realized with a reduced thickness in comparison to the thickness of the subassembly element.

It is also preferred that the depressions be essentially realized in the shape of a channel with lateral surfaces and a bottom surface, with the lateral surfaces of both depressions that are situated adjacent to one another being partially formed by the web. The lateral surfaces are, in particular, aligned essentially parallel to one another, wherein the lateral surfaces may also extend at a predetermined angle referred to a line that extends perpendicular to the outer side of the subassembly element in such a way that the rear edge of the outer side of the subassembly element viewed in the driving direction forms an angle of less than 90°. This design is, for example, advantageous in instances in which the cover parts are respectively shifted toward the rear and the front, as well as toward the top and the bottom, at the beginning of the opening process and at the end of the closing process of a multi-spoiler sliding roof. In this case, the previously described flanks on the edges of the subassembly parts which deviate from 90° prevent the subassembly parts that, for example, are provided as cover parts from contacting one another when opening or closing the cover elements.

The material of the previously described subassembly element may be arbitrarily chosen from conventional materials. Consequently, it is possible to manufacture the subassembly element uniformly from metal, plastic or glass. However, the subassembly element is preferably realized in a multilayer fashion. In this case, a foil-like outer layer and/or inner layer which form the outer and/or inner side of the subassembly element, as well as a core that supports the outer and/or inner layer, are provided. This means that the subassembly element may, among other things, also be realized in accordance with the known sandwich structure. The outer layer may, in particular, consist of metal, plastic or glass, with the outer layer containing, in particular, a coating, e.g., in the form of a layer of enamel. The core is preferably manufactured from a foamed material, a corrugated foil, a honeycomb-shaped material or another lightweight material that, in particular, has a high strength. In addition, the inner side of the subassembly element, in particular, the core, may also be coated, e.g., for realizing the inside roof lining of the motor vehicle interior.

In the previously described multilayer design, the outer layer is correspondingly shaped such that it forms the depression provided on the outer side of the subassembly element. The depression on the inner side of the subassembly element may be arranged in the material of the core. Due to this measure, the outer layer extends along the entire surface of the subassembly element with the same thickness. In this case, the core may have different thicknesses in order to form the previously described structure of the depressions.

In the previously described multilayer design, the web that respectively connects two subassembly parts may essentially consist of the material of the outer layer and/or the inner layer such that the web may have a reduced thickness in comparison to the remaining thickness of the subassembly element. Consequently, the web can be easily severed. In addition, it is preferable to additionally provide a layer consisting of the material of the core on one side of the web. Despite this measure, it is still possible to realize the thickness of the web as less than 50%, preferably less than 25%, of the thickness of the layer. As described above, this makes it possible to easily separate two respectively attached subassembly parts from one another.

The previously described subassembly element according to the invention represents an intermediate product from which at least two subassembly parts of a cover element for a motor vehicle are manufactured. For this purpose, two respective subassembly parts are separated from one another along the web provided between said subassembly parts, such that subassembly parts which can be separately handled are obtained. These subassembly parts can then be used to assemble a cover element for a motor vehicle. In this case, the depressions at least partially overlap one another in the closed position of the cover element. In the edge regions between two adjacent subassembly parts, this results in a structure in which, in particular, a seal can be arranged between both subassembly parts. For this purpose, it is preferred that the bottom surfaces of the depressions at least partially overlap one another, i.e., the bottom surfaces of the depressions are arranged opposite to one another. If the separating cut between the two subassembly parts is also produced along the web essentially at the elevation of the bottom surface of the depression formed, in this case, on the inner side of the subassembly element, an essentially smooth surface is obtained on the underside of one edge of the corresponding subassembly part. The associated edge of the adjacent subassembly part then contains the upwardly protruding web such that this edge of the subassembly part forms a channel for collecting water and for accommodating a seal.

It is also preferred to realize the seal in the form of a sealing strip that can be elastically folded and, for example, contains a film hinge such that an enlarged water channel enabled to form when the associated edge of the adjacent subassembly part is raised—specifically by means of the elastic restoration of the upper limb of the sealing strip. The design of the sealing strip has separate inventive merit.

In one embodiment, the seal is realized in the form of a hollow seal with a cross section in the shape of a segment of a circle.

This means that the manufacture of the subassembly parts of the cover element for motor vehicles is carried out by initially manufacturing the previously described one-part subassembly element in the form of an intermediate product, namely by shaping a flat material. After the one-part subassembly element is formed, the subassembly parts are separated from one another by a separating cut that, in particular, extends transverse to the driving direction, with the separating cut respectively being situated in one lateral surface of a preferably channel-shaped depression. Due to this measure, it is advantageously possible to manufacture a cover element for motor vehicles in which the subassembly parts of a roof cover are manufactured in the form of intermediate products such that their surface designs can be easily adapted to one another in the overlapping edge regions.

It is preferred to provide a subassembly element with depressions on its inner side. In this case, the separating cut is placed within this depression in such a way that it extends between the two adjacent depressions in the outer side and in the inner side.

It is also preferred to produce the separating cut along the web essentially at the elevation of the bottom surface of the depression arranged in the inner side of the subassembly element.

Due to these advantageous measures, the connected subassembly parts of the subassembly element can be separated from one another along a web that essentially represents the thinnest section of the subassembly part. In this case, a smooth surface can also be achieved on the inner side of the subassembly part while the other edge of the associated subassembly part contains a channel-like structure.

The aforementioned and claimed components, as well as the components to be used according to the invention in the described embodiments, are not subject to any special exceptions with respect to their size, shape, material selection and technical concepts, such that the selection criteria known in the respective field of application can be applied in unlimited fashion. Additional details, characteristics and advantages of the object of the invention are discussed in the following description of the corresponding figures that show—exemplary—preferred embodiments of the subassembly element according to the invention.

BRIEF DESCRIPTION OF THE DRAWINGS.

The figures show:

FIGS. 1A/B an oblique representation of the rear section of a so-called pickup truck with a cover element for the cargo space in the closed position (FIG. 1A) and in an exploded view (FIG. 1B);

FIG. 3 a (partial) multi-spoiler sliding roof for motor vehicles in the closed position, with said multi-spoiler sliding roof being manufactured from the subassembly element shown in FIG. 2 (section along the line III—III in FIG. 2);

FIG. 4 a section along the line IV–IV in FIG. 1 through another (partial) embodiment of a cover for a cargo space in motor vehicles;

FIG. 5 another embodiment viewed in the same direction as in FIG. 4;

FIG. 6 a section through FIG. 1 along the line VI—VI, and

DETAILED DESCRIPTION OF THE PREFERRED EMBODIMENT

FIGS. 1A/B shows an oblique representation of the rear section of a motor vehicle 5. The motor vehicle consists of a so-called pickup truck that is essentially characterized by a loading zone 6 that is open toward the top. This loading zone 6 can be opened and closed—similar to a multi-spoiler sliding roof—with a cover element 8 that, in particular, slides in the driving direction F. This cover element 8 essentially consists of three subassembly parts 1, 2 and 3 that are realized in the form of cover parts and are described in greater detail below with reference to FIGS. 4–6.

Figure 2:
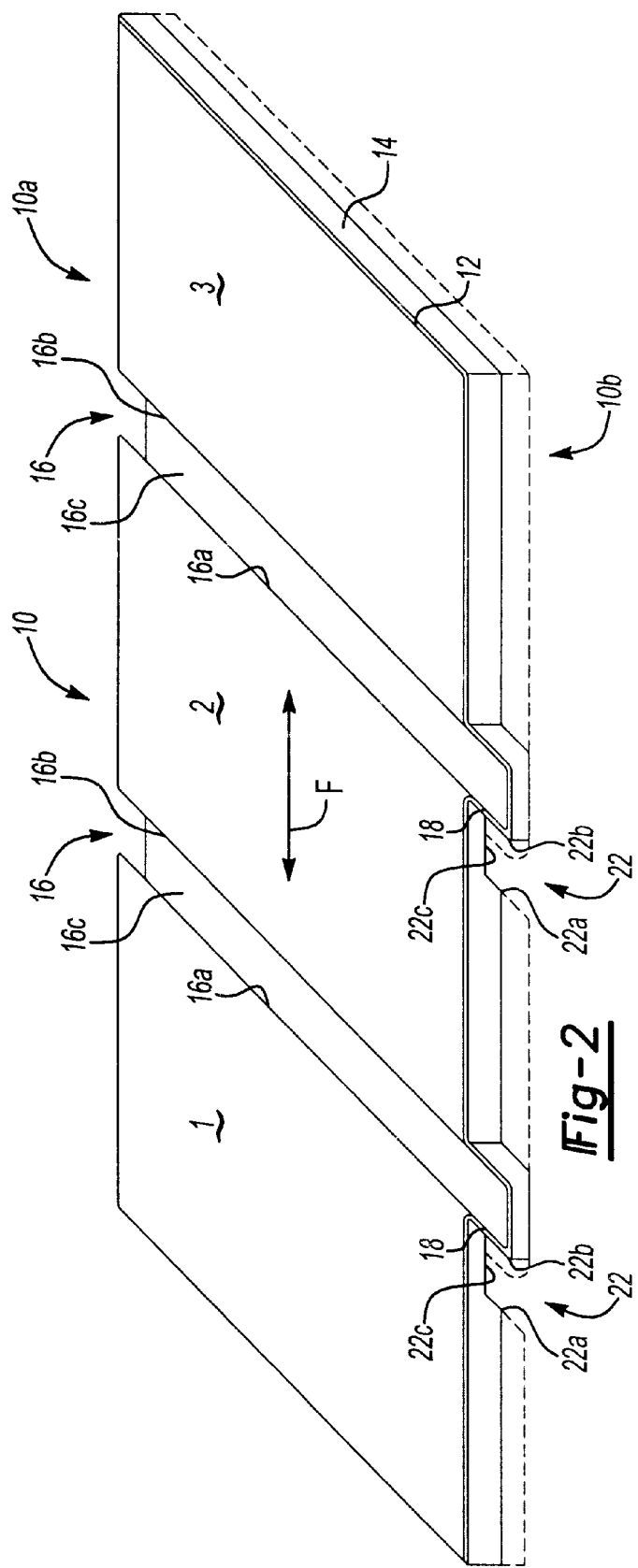
FIG. 2 a first embodiment of a subassembly element for a cover element for motor vehicles, in the form of an oblique representation.

FIG. 2 shows an embodiment of a subassembly element 10, e.g., for a multi-spoiler sliding roof for motor vehicles, in the form of a schematic representation. The subassembly element 10 represents an intermediate product for the manufacture of cover parts 1, 2 and 3 of the cover element 8—in this case a multi-spoiler roof cover. The subassembly element 10 (roof cover) comprises three coherent cover parts 1, 2 and 3 (=subassembly parts) which already have the shape required for the roof covers of a multispoiler sliding roof or a cargo space cover.

The connecting regions between the individual cover parts 1, 2 and 3 or the edge regions in which two respective cover parts 1 and 2 or 2 and 3 should subsequently adjoin one another after the cover parts are separated are respectively realized identically or similarly, such that only the edge regions between the two cover parts 1 and 2 are described in detail below.

A first channel-shaped depression 16 is arranged in the outer side 10A of the subassembly element 10, in the region in which two cover parts 1 and 2 or 2 and 3 adjoin one another. According to the invention, the contour of the depression 16 is comprised of the desired contours of the edge regions 16A, 16B and 16C of the two adjacent cover parts 1 and 2.

In addition, a second channel-shaped depression 22 is arranged on the inner side 10B of the subassembly element 10, in the region in which two cover parts 1 and 2 or 2 and 3 adjoin one another. FIG. 2 indicates that both depressions 16 and 22 are arranged adjacent to one another and are offset relative to one another viewed in the (driving) direction F.

The depressions 16 and 22 are designed in such a way that the sum of the depths of the depressions 16 and 22 is greater than the thickness of the subassembly element 10 in the edge region and the depressions 16 and 22. In the embodiment shown in FIG. 2, this is ensured due to the fact that both depressions 16 and 22 have the same depth, with each depth being greater than half the thickness of the subassembly element 10. The depression 16 may—in principle—be realized deeper than the depression 22 or vice versa. In any case, because of the proximity and the overlapping depths of the two depressions 16 and 22 a connecting web 18 is preferably formed between both depressions 16 and 22 and consequently between two cover parts 1 and 2 or 2 and 3. In this case, the web 18 represents the thinnest region of the subassembly element 10, such that the separation of two cover parts described below can be easily realized along the web 18. If observed in a side view, the connecting region between the cover parts 1 and 2 or 2 and 3 consequently has a progression similar to a rectangular channel.

The depressions 16 and 22 are essentially aligned perpendicular to the driving direction F of the motor vehicle when the cover parts 1, 2 and 3 are installed in the motor vehicle as a multi-spoiler sliding roof or a cargo space cover.

The depressions 16 and 22 are realized in a channel-shaped fashion and respectively contain lateral surfaces 16A, 16B and 22A, 22B, as well as a bottom surface 16C and 22C. In this case, the lateral surfaces 16A and 22B are at least partially formed by the web 18. The respective lateral surfaces 16A, 16B and 22A, 22B essentially extend parallel to one another and are aligned at a predetermined angle relative to a line that extends perpendicular to the outer side 10A.

In this embodiment, the lateral surfaces 16A, 16B and 22A, 22B are aligned relative to this perpendicular line at an angle that deviates from 90°. On the rear edges of the cover parts, the outer side 10A of the subassembly element 10 forms an acute angle with the lateral surfaces 16A, with the outer side 10A of the subassembly element forming an obtuse angle with the lateral surfaces 16B on the front edges of the cover parts. Among other things, this ensures that shifting the cover parts 1 and 2 from the closed position can be effected backward and upward simultaneously as is common practice with adjusting mechanisms for multi-spoiler sliding roofs for motor vehicles. At the beginning of the opening movement for the multi-spoiler sliding roof, from the closed position, at least the rear edge of the cover parts 1 and 2 is displaced essentially along the direction defined by the rear cover edge such that the edges of respectively adjacent cover parts 1 and 2 or 2 and 3 do not contact one another when the sliding roof is opened.

FIG. 3 shows a section of the multi-spoiler sliding roof in the closed position, in the area of the overlapping edge regions of two cover parts 1 and 2.

The bottom surfaces 16C and 22C are situated opposite to one another in a partially overlapping fashion such that a hollow space 25 consisting of the lateral surfaces 16A, 16B and the bottom surfaces 16C and 22C is formed. FIG. 3 also shows that the separating cut extends along the web 18 at the elevation of the bottom surface 22C of the second depression 22 such that a plane surface without edges or ribs that protrude upward is achieved. This means that practically the entire height of the web 18 forms the front edge of the cover part 2 such that a channel-shaped depression 16 of maximum volume remains. This channel serves, in particular, as a water channel for carrying off water laterally.

FIGS. 2 and 3 also show that the subassembly element 10 consists of several layers. It contains an outer layer 12 that forms the outer side 10A of the subassembly element 10 and a core 14 that is rigidly connected to the inner side 10B of the subassembly element 10 and supports the outer layer 12. In this case, the outer layer 12 consist, for example, of a foil or a sheet of aluminum. However, other metals, plastics or even glass may also be used. The outer surface of the outer layer 12 is also provided with a coating 12A that consists of a layer of enamel. Consequently, the color of the outer side of the cover parts 1 and 2 can be adapted to the color of the motor vehicle roof.

In this embodiment, the core 14 consists of a foamed material that is applied to the underside of the outer layer 12. Alternatively, the core 14 may also consist of a corrugated foil, a honeycomb-shaped material, or a lightweight material with high strength. The core 14 is also provided with a coating 14A (inner layer) on the inner side 10B of the roof cover 10, with said coating forming the inside roof lining of the multi-spoiler sliding roof to be manufactured from the cover parts 1 and 2.

The depressions 16 and 22 according to the invention are arranged in the roof cover 10 of the embodiment shown in FIG. 2 as described below. The foil-like outer layer 12 is correspondingly shaped such that it forms the depression 16 due to the fact that it follows the desired contour of the outer side of the one-part subassembly element 10. Consequently, the shape of the outer layer 12 not only defines the curved surface of the cover parts 1, 2 and 3, but also the shape of the depressions 16 and 22. However, the core 14 that is connected to the outer layer 12 has a varying thickness because the depression 22 is arranged in the material of the core 14.

In the embodiment shown in FIG. 2, the web 18 that connects the two cover parts 1 and 2 or 2 and 3 to one another essentially consists of the material of the outer layer 12. An alternative design of the shape of the core 14 (drawn with broken lines) is shown in FIG. 2. In this case, one side of the web 18 is also covered with the material of the core.

FIG. 3 also shows that an elastic seal 24 is fixed to the bottom surface 16C. In this embodiment, this seal is realized in the form of the sealing strip with the film hinge 24A and two limbs 24B and 24C. In the closed position of the two cover parts 1 and 2, the sealing strip 24 is compressed such that an effective seal is formed between the two cover parts 1 and 2.

The broken line in FIG. 3 indicates that the upper limb 24B is raised upward due to the elastic restoration of the sealing strip 24 when the multi-spoiler sliding roof is opened. This means that a water channel is formed with the aid of the sealing strip 24 when the roof cover 1 is raised. In this case, the upper limb 24B extends beyond the upper edge of the web 18 such that water can be effectively collected by the unfolding water channel and laterally carried off, in particular, in instances in which water has accumulated in the edge region between the closed cover parts 1 and 2.

FIG. 4 shows a section along the line IV—IV in FIG. 1A. This embodiment pertains, in particular, to a cover element 8 for a loading zone 6. The cover parts 1 and 2 also consist of several layers and contain an outer layer 12, a core 14 and a coating 14A on the inner side 10B. In other respects, this embodiment differs due to the fact that the web 18 was not severed flush with the bottom surface 22C, such that two webs 18A and 18B are formed. These webs 18A and 18B respectively form a hollow space 25A and 25B. A seal 24 is inserted into the hollow space 25B of the cover part 1. This seal 24 is realized in the form of a hollow seal that seals against the end of the web 18A of the cover part 2, which faces the seal 24.

FIG. 5 shows the same sectional representation as the previously described FIG. 4, however, for another embodiment of the cover parts 1 and 2 and the web 18. In this case, the cover parts 1 and 2 merely consist of an outer layer 12 that forms the outer side 10A and a core 14 arranged underneath the outer layer. A coating of the core 14 is not provided in this case. The conduct of the separating cut through the web 18 is comparable to that shown in FIG. 3, and together with the lateral surface 16B and the bottom surface 16C, forms a channel-shaped hollow space 25 for accommodating the seal 24. The seal 24 adjoins the bottom surface 22C of the cover part 1 in a sealing fashion.

In comparison to the embodiment shown in FIG. 3, the webs 18 according to FIGS. 4 and 5 also differ due to the fact that the webs 18 are not formed only by the outer layer 12 of the cover parts 1 and 2, but also by a part of the core 14 (see FIG. 5), as well as by the coating 14A of the core (see FIG. 4).

FIG. 6 shows a section through FIG. 1A along the line VI—VI and elucidates the lateral guidance of the cover parts 1, 2 and 3 on the wall 7 of the loading zone 6. For this purpose, a guide rail 28 that extends in the driving direction is provided on the inner side of the wall 7 of the loading zone 6. This guide rail contains a first channel 29 that is open toward the top and a second channel 30 that is open inward, i.e., toward the loading zone 6. The guide rail 28 essentially has a C-shaped cross section, with an upwardly extending projection 31 being provided on the end of the upper limb. This projection forms the first channel 29 together with the wall 7 of the motor vehicle 5. A third channel 32 that extends in the sliding direction is provided on the lateral ends of the cover parts 1, 2 and 3, with the projection 31 of the guide rail 28 being engaged with said channel. Consequently, the cover parts 1, 2 and 3 can be placed onto the guide rail 28 from the top and displaced in the driving direction F.

In order to prevent the cover parts 1, 2 and 3 from being lifted off the guide rail 28 while they are being displaced, a projection 33 is provided on the inner side 10B of the cover parts 1, 2 and 3 in the vicinity of their lateral edges. This projection 33 extends downward and is situated adjacent to the open end of the second channel 30. A throughhole 34 is arranged in the projection 33. A bolt 35 can be inserted into the aforementioned through-hole until it engages in the second channel 30. In this way, the cover parts 1, 2 and 3 are additionally guided along the guide rail 28 and secured from being lifted off said guide rail.

Figure 7A:
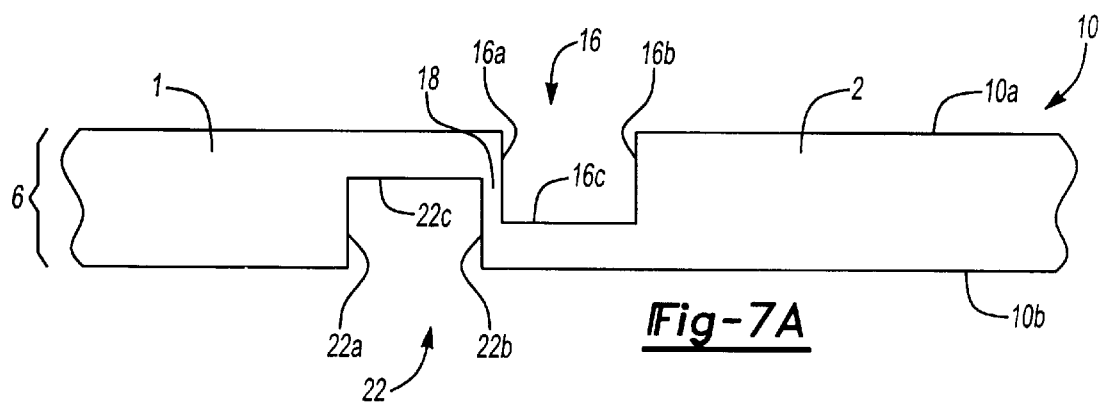
FIGS. 7A–7C a schematic embodiment of a (partial) cover element in three different operating phases.
Figure 7B:
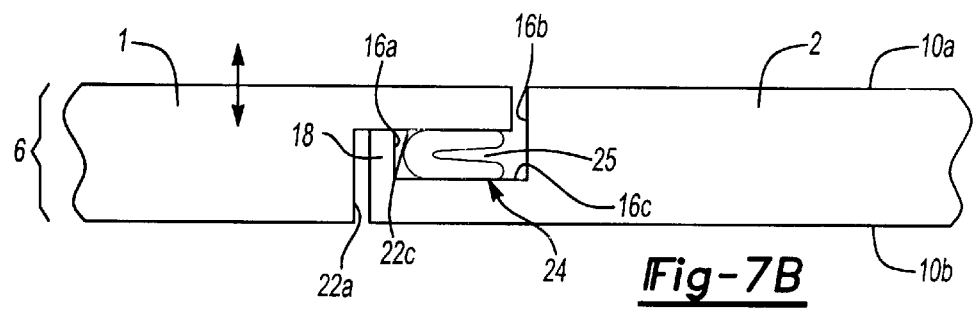
Figure 7C:
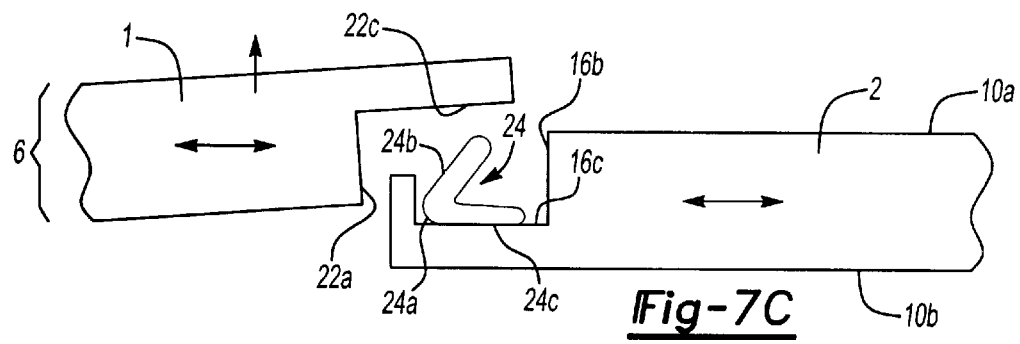

A second schematic embodiment of the subassembly element according to the invention, as well as the cover element to be manufactured thereof, is illustrated in FIGS. 7A–7C. In contrast to the previously described embodiments, this subassembly element is manufactured from one layer of a single material, e.g., plastic or glass.

As in the previously described embodiments, the depressions 16 and 22 in the subassembly element shown in FIG. 7A are realized in the shape of channels that essentially extend perpendicular to the driving direction of the motor vehicle, and respectively contain lateral surfaces 16A, 16B and 22A, 22B, as well as bottom surfaces 16C and 22C. In this case, the lateral surfaces 16A, 16B and 22A, 22B are also aligned parallel to one another, at an angle of 90° referred to a line that extends perpendicular to the outer side 10A. This means that the lateral surfaces 16A, 16B and 22A, 22B respectively extend perpendicular to the outer side 10A and to the inner side 10B of the subassembly element.

FIGS. 7B and 7C show that the two subassembly parts 1 and 2 are also separated from one another along the web 18 in this embodiment, with the depressions 16 and 22 at least partially overlapping in the closed position of the cover element (FIG. 7B) and engaging into one another. Consequently, a hollow space 25 is formed by the lateral surfaces 16B and 22B and the bottom surfaces 16C and 22C. A seal 24 that is realized in the form of a sealing strip and functions analogously to the seal described with reference to the embodiment according to FIG. 3 is arranged in this hollow space.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A subassembly element in the form of an intermediate product for a cover element for a motor vehicle which contains at least two subassembly parts containing edge regions on adjacent edges of the subassembly parts which are correspondingly shaped to at least partially overlap in a closed position, wherein said subassembly parts are present in the form of a connected-together part and are shaped in accordance with a predetermined contour of the cover element, wherein a first channel-shaped depression is arranged at least in an outer side of the subassembly element in the edge region in which two respective subassembly parts adjoin, and wherein a contour of the first channel-shaped depression is comprised of a desired contours of the edge regions of adjacent subassembly parts of the respective cover element.

2. The subassembly element according to claim 1, wherein a second channel-shaped depression is arranged in an inner side of the subassembly clement, in the edge region in which the subassembly parts adjoin.

3. The subassembly lenient according to claim 2, wherein a sum of a depths of the depressions is greater than a thickness of the subassembly element in the edge region in which the subassembly parts adjoin, and a web is formed between the depressions.

4. The subassembly clement according to claim 1, wherein each of the channel-shaped depressions include a pair of lateral surfaces and a bottom surface.

5. The subassembly clement according to claim 4, wherein the pair of lateral surfaces of each of the depressions are aligned substantially parallel to one another.

6. The subassembly element according to claim 4, wherein the pain of lateral surfaces are aligned at a predetermined angle referred to a line that extends substantially perpendicular to the outer side.

7. The subassembly clement according to one of claim 1, wherein the subassembly element consists of several layers and contains a foil-like outer layer that forms an outer surface and a core that supports the outer layer.

8. The subassembly element according to claim 7, wherein the outer surface of the outer layer is provided with a coating of a layer of enamel.

9. The subassembly element according to claim 7, wherein the core consists of one of a foamed material, a corrugated foil, and a honeycomb-shaped material.

10. The subassembly element according to claim 7, wherein the core is provided with a coating on an inner side of the subassembly element, wherein the coating forms an inside roof lining of the motor vehicle.

11. The subassembly element according to one of claim 7, wherein the outer layer forms the first depression, and the second depression is arranged in the material of the core.

12. The subassembly element according to claim 7, wherein an inner side of the core is at least partially adapted to a shape of the depression.

13. The subassembly element according to claim 3, wherein the web essentially consists of the material of the outer layer.

14. The subassembly element according to claim 1, wherein the subassembly element is for a multi-part sunroof cover.

15. The subassembly element according to claim 1, wherein the subassembly element is for a cargo space cover.

16. A multipart cover element for a motor vehicle, containing at least two subassembly parts with edge regions on the adjacent edges of the subassembly parts which are correspondingly shaped such that the edge regions at least partially overlap in a closed position, wherein the cover element is manufactured from a subassembly element in the form of an intermediate product, wherein said subassembly parts are present in the form of a connected-together part and are shaped in accordance with a predetermined contour of the cover element, wherein a first channel-shaped depression is arranged at least in an outer side of the subassembly element in the edge region in which two respective subassembly parts adjoin, and wherein a contour of the first channel-shaped depression is comprised of a desired contours of the edge regions of adjacent subassembly parts of the respective cover element, wherein a seal is fixed on a bottom surface of a channel-shaped depression in one of the respective edge regions.

17. The cover element according to claim 16, wherein the seal is a hollow seal with a cross section in the shape of a segment of a circle.

18. The cover element according to claim 16, wherein the seal can be folded elastically.

19. The cover element according to claim 18, wherein the seal is in the form of a sealing strip with a film hinge.

20. The cover element according to claim 19, wherein the seal is fixed on the bottom surface of the subassembly part, and a water channel is formed due to elastic restoration of an upper limb of the scaling strip when the adjacent subassembly part is raised.

* * * * *